(12) United States Patent
Geller

(10) Patent No.: US 8,875,457 B2
(45) Date of Patent: Nov. 4, 2014

(54) PORTABLE LIGHT MANIPULATOR

(76) Inventor: Wolfgang-Peter Geller, Garlstorf (DE)

( * ) Notice: Subject to any disclaimer, the term of this patent is extended or adjusted under 35 U.S.C. 154(b) by 256 days.

(21) Appl. No.: 13/391,050

(22) PCT Filed: Jul. 2, 2010

(86) PCT No.: PCT/EP2010/059490
§ 371 (c)(1),
(2), (4) Date: Mar. 20, 2012

(87) PCT Pub. No.: WO2011/020642
PCT Pub. Date: Feb. 24, 2011

(65) Prior Publication Data
US 2012/0170278 A1    Jul. 5, 2012

(30) Foreign Application Priority Data

Aug. 19, 2009   (DE) .................... 20 2009 010 894 U

(51) Int. Cl.
| | | |
|---|---|---|
| E04B 1/343 | (2006.01) |
| F21V 17/02 | (2006.01) |
| F21V 11/00 | (2006.01) |
| F21V 7/10 | (2006.01) |
| G03B 15/06 | (2006.01) |
| F21V 7/18 | (2006.01) |

(52) U.S. Cl.
CPC .. *G03B 15/06* (2013.01); *F21V 7/18* (2013.01)
USPC ............. 52/222; 359/847; 359/849; 359/871; 362/18; 362/357

(58) Field of Classification Search
USPC ............. 52/63, 222, 273, 769, 773; 359/847, 359/849, 871; 362/18, 352, 355, 357, 358
See application file for complete search history.

(56) References Cited

U.S. PATENT DOCUMENTS

| | | | | |
|---|---|---|---|---|
| 2,129,154 | A * | 9/1938 | Sherman ...................... 362/355 |
| 2,545,251 | A | 3/1951 | Barettella | |
| 3,062,157 | A * | 11/1962 | Woods ......................... 410/149 |
| 3,451,153 | A * | 6/1969 | Dohanyos ..................... 40/741 |
| 3,570,412 | A * | 3/1971 | Holman, Jr. ................. 410/153 |
| 3,574,447 | A * | 4/1971 | Ruble ........................... 359/847 |
| 3,583,466 | A * | 6/1971 | Dreyer ......................... 160/351 |

(Continued)

FOREIGN PATENT DOCUMENTS

| | | |
|---|---|---|
| DE | 19950950 | 11/2001 |
| EP | 0597199 | 5/1994 |

OTHER PUBLICATIONS

English Translation of International Preliminary Report on Patentability for PCT/EP2010/059490 dated Feb. 21, 2012 (7 pages).*

*Primary Examiner* — Brian Glessner
*Assistant Examiner* — Rodney Mintz
(74) *Attorney, Agent, or Firm* — Sand & Sebolt

(57) ABSTRACT

The invention relates to a portable light manipulator including a frame and a manipulator cloth that is stretched or can be stretched on the frame, wherein the frame includes at least one tension bar, which has at least two moving sections that can be moved in the longitudinal direction of the tension bar and are connected to one another or can be connected to one another, said moving sections being spring-loaded so as to be capable of being forced apart from one another by spring force in the longitudinal direction of the tension bar.

16 Claims, 5 Drawing Sheets

(56) References Cited

U.S. PATENT DOCUMENTS

| | | | |
|---|---|---|---|
| 3,836,174 A * | 9/1974 | Holman, Jr. | 410/149 |
| 3,952,463 A * | 4/1976 | Lane | 52/63 |
| 4,091,485 A * | 5/1978 | Dohet | 114/354 |
| 4,179,193 A * | 12/1979 | Gillette et al. | 359/847 |
| 4,428,030 A * | 1/1984 | Baliozian | 362/18 |
| 4,519,151 A * | 5/1985 | Johnson | 38/102.9 |
| 4,532,744 A * | 8/1985 | Beneze et al. | 52/222 |
| 4,552,438 A * | 11/1985 | Murphy | 359/847 |
| 4,832,104 A * | 5/1989 | De Labarthe et al. | 160/343 |
| 4,998,189 A * | 3/1991 | Guggemos | 362/278 |
| 5,104,269 A * | 4/1992 | Hardison | 410/149 |
| 5,373,422 A * | 12/1994 | Hodkinson | 362/18 |
| 5,436,804 A * | 7/1995 | Henry | 362/16 |
| 5,557,870 A * | 9/1996 | Bergman | 40/603 |
| 5,579,180 A * | 11/1996 | Geller | 359/847 |
| 5,927,668 A * | 7/1999 | Cyrell | 248/317 |
| 5,944,464 A * | 8/1999 | Cole, Jr. | 410/153 |
| 6,000,175 A * | 12/1999 | Gale et al. | 52/63 |
| 6,030,087 A * | 2/2000 | Whittle | 362/18 |
| 6,102,350 A * | 8/2000 | Cyrell | 248/317 |
| 6,412,967 B2 * | 7/2002 | Geller | 362/18 |
| 7,054,549 B2 * | 5/2006 | Hiesinger | 396/3 |
| 7,134,758 B1 | 11/2006 | Baker | |
| 7,337,737 B1 * | 3/2008 | Fanucci et al. | 114/75 |
| 7,398,626 B2 * | 7/2008 | Greschbach | 52/650.3 |
| 7,609,949 B2 * | 10/2009 | Ealer | 396/4 |
| 8,274,737 B2 * | 9/2012 | Wang | 359/461 |
| 8,382,302 B2 * | 2/2013 | Geller | 362/18 |
| 8,683,771 B2 * | 4/2014 | Sawyers et al. | 52/656.7 |
| 8,695,306 B2 * | 4/2014 | Cvek | 52/660 |
| 2001/0009513 A1 * | 7/2001 | Geller | 362/319 |
| 2002/0051289 A1 * | 5/2002 | Congard | 359/443 |
| 2004/0020154 A1 * | 2/2004 | Greschbach | 52/582.1 |
| 2004/0246725 A1 * | 12/2004 | Eldridge et al. | 362/352 |
| 2005/0111841 A1 * | 5/2005 | Geller | 396/4 |
| 2007/0256800 A1 * | 11/2007 | Armstrong | 160/371 |
| 2010/0182793 A1 * | 7/2010 | Geller | 362/341 |
| 2010/0206364 A1 * | 8/2010 | Armstrong | 136/252 |
| 2012/0247056 A1 * | 10/2012 | Sawyers et al. | 52/656.9 |

* cited by examiner

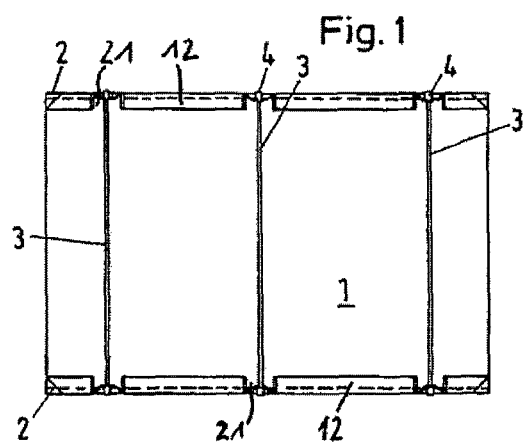
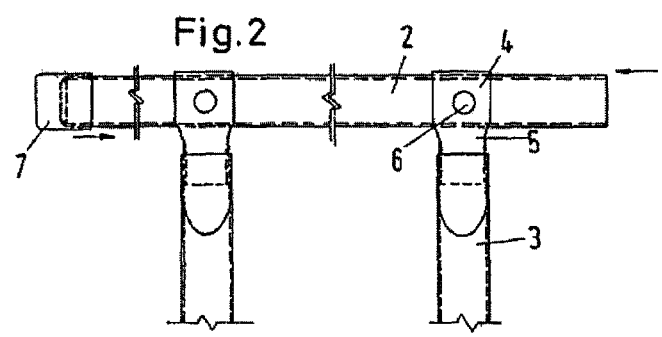
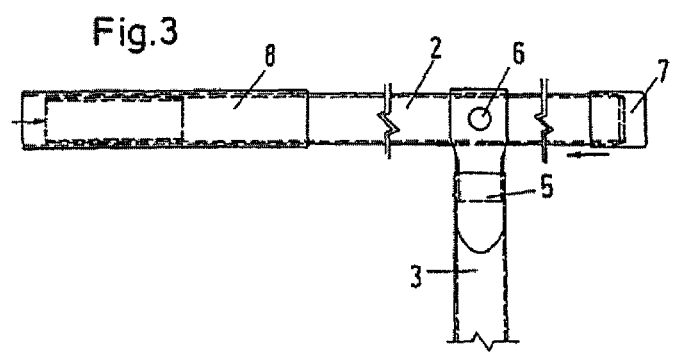

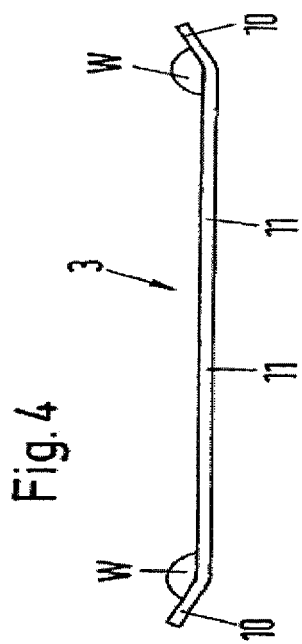

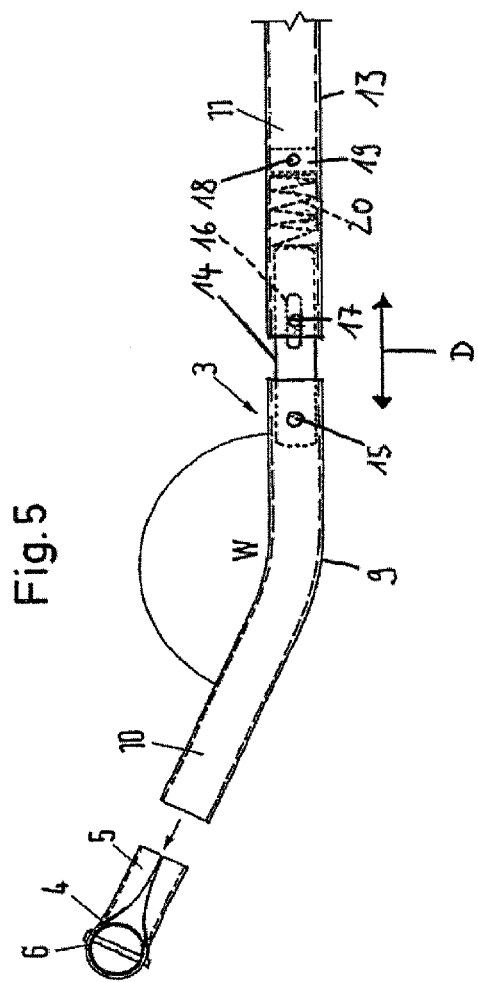

PORTABLE LIGHT MANIPULATOR

CROSS REFERENCE TO RELATED APPLICATIONS

This application is a National Stage Entry of PCT Application Serial No. PCT/EP2010/059490 having an international application date of Jul. 2, 2010, which application claims priority from German Patent Application No. 20 2009 010 891.5, filed Aug. 19, 2009.

TECHNICAL FIELD

The invention relates to a portable light manipulator which includes a frame and a manipulator cloth.

PRIOR ART

A portable light manipulator of this kind is disclosed in the form of a light reflector such as, for example, in EP 0 597 199 A1. The light reflector described therein finds multiple practical applications and is used for illuminating film and photo sets. It has the special advantage that it can be disassembled quickly and easily into only a few parts thus forming a lightweight unit that can be comfortably transported by one person. Similarly, it is comparatively easily assembled at its intended location thus ensuring quick operational use and without losing valuable recording time.

Aside from their use as light reflectors, similarly assembled light manipulators are known in practice as well; they use, instead of the reflector cloth, for example, a light diffuser cloth in order to diffuse the incoming light for the purpose of illuminating the recording set and thereby arriving at more differentiated and therefore softer contours.

Even though the known portable light manipulators have basically proven their utility, there still exists a further need for improvement. For example, setting up the known portable light manipulator requires quite a substantial application of force by the user in order to fasten the cross member to the longitudinal members because for each fastening action it is necessary to overcome almost the complete tension that is created by the elastic manipulator cloth and/or the elastic means for fixing them to the longitudinal members. Depending on the elasticity and, in particular, the age of the manipulator cloth and/or the means for fixing the longitudinal members, this expended force can be enormous, meaning that, in particular, persons of lesser physical strength or female assistants have difficulty setting up the portable light manipulator and require help. Moreover, solely the application of the holding force to the frame that is required due to the tension of the cloth calls for especially precise dimensioning of the cloth and an adaptation of the dimensions to the tension force that is appropriate for implementing the correct measure of tension force; however, when the cloth ages, this tension force can weaken and it may no longer be possible to ensure a sufficient hold on the frame

BRIEF DESCRIPTION OF THE INVENTION

The inventor defined for himself the task of providing a remedy and describing an improved portable light manipulator that is easier to handle in terms of its assembly and that provides a higher tolerance with regard to the tension of the cloth and/or tension due to the elasticity of the means for fixing it on the longitudinal members as well as counteracts a reduction of these tensions due to the effects of aging, thus ensuring that in the event of such aging a sufficient and reliable hold of the light manipulator will still be provided when it is in its operational position.

According to the invention this object is achieved by a portable light manipulator in which the frame includes a tension bar with at least two spring-loaded moving sections movable in a longitudinal direction of the tension bar, and the manipulator cloth is secured to the frame by a fastening means, and wherein the cloth or the fastening means has an elasticity that pulls the moving sections toward each other when the light manipulator is in an operating position.

The core idea and basis for the invention is that at least one member, which is according to the prior art only a passive member-element, is now involved as an active part in building up the tension in the manipulator cloth and/or in the assembled light manipulator, meaning is it configured as a tension bar. To this end, the tension bar comprises at least two moving sections that are displaceable in the longitudinal direction relative to each other and that are or that can be connected—movable in the longitudinal direction—with each other. A spring force is provided therein between the moving sections that forces these sections apart from each other, meaning said force spreads the tension bar apart.

On the one hand, this measure allows for a considerable reduction of the application of force during the assembly of the portable light manipulator according to the invention; because, when connecting the frame now with the fastening means on the manipulator cloth, all that is needed is a "compression" of the tension bar against the spring force, which can be achieved with less expenditure of force than was necessary for stretching the cloth in connection with the known light reflector based on the prior art according to EP 0 597 199 A1. Moreover, due to the spring force in the tension bar, provided the correct spring force and travel path are selected, around which the tension bar is "stretched," an additional stretching moment is applied to the manipulator cloth allowing, on the one hand, for an improved and safer hold of the frame overall and thereby higher tolerances in the tension of the manipulator cloth and/or of the fastening means and, on the other hand, for countering a reduction of the elasticity and resilience of the manipulator cloth and/or the fastening means thus compensating for any effect due to a reduction of the tension in the manipulator cloth.

A possible embodiment of the tension bar that is subdivided in at least two moving sections. Correspondingly, the tension bar can be configured, together with the moving sections adjacent to each other in the region of these moving sections, in a tubular fashion, and an inner tube and/or a solid inner cylinder can, respectively, be inserted in one end that provides, on the one hand, the connection and achieves, on the other hand, the relative mobility in the longitudinal direction. This inserted inner tube and/or inner cylinder is fixedly disposed relative to a first of the moving sections; on a second of the moving sections, it is routed, forcibly movable, in the longitudinal direction of the tension bar. This forcible routing action extends across the preset travel which is ultimately determined based on the geometry of the frame and the desired added tension effect. The spring force that is necessary for pushing the two moving sections apart is created by a pressure spring element that is disposed between a stationary stop disposed in the second moving section and the end of the inner tube and/or the inner cylinder disposed in this moving section. This pressure spring element can be, for example, a coil spring.

The forcible routing should, especially if the ends of the bars are extending in an angular fashion, have torsional strength allowing only for a longitudinal movement but preventing any relative twisting. This can be achieved, for example, by a structural solution where the forcible guide is an oblong hole provided in the inner tube and through which there extends a stud, which ensures exclusively, a relative mobility in the axial direction, any rotational movement around the longitudinal axis is prevented by the hold between the oblong hole and the stud.

Due to the angular ends of the member, as can be provided in an advantageous improvement, the frame is created not only in one plane but experiences an alignment also in a third dimension. Due to this extension into an additional third dimension, the frame is still stable and, in particular, torsionally stiff in the assembled state. This is advantageous not only for outdoor uses in which the portable light manipulator may also be exposed to additional torsional forces, for example, due to the influence of the wind. Stability that is thus increased also results in a clear improvement of the manageability for indoor shots. Moreover, due to the angulation, it is possible to avoid any undesired bulging of the manipulator cloth in the area of the members extending in the rear of the manipulator cloth.

The angles and/or angular areas where the frame comprises at least one member that extends at its ends at an angle greater than 90°, preferably in the range of between 120° to 170°, and particularly at 155°, have proved especially expedient.

It is advantageous for the frame to be configured as a frame that can be disassembled and/or that is collapsible. This allows for especially compact and easy transportation.

It is especially advantageous in this case if, when in operational position, the forces created by the elasticity of the manipulator cloth act upon the frame thus promoting the cohesiveness of the frame.

In an especially simple embodiment the frame advantageously includes two longitudinal members and at least one cross member. The longitudinal members therein can be brought in a congruent position with the longitudinal sides of the manipulator cloth and connected thereto. The at least one cross member extends between the longitudinal members. Advantageously, said cross member is fastened in the middle of the two longitudinal members that extend in a parallel fashion.

It is advantageous for the at least one cross member and/or the longitudinal members to be configured as (a) tensions bar(s). The choice regarding which member(s) is (are) to be configured as (a) tension bar(s) is made by the person skilled in the art based on the configuration of the frame, the shape of the manipulator cloth and the desired tension of the manipulator cloth.

It is especially advantageous if at least one cross member is configured as angular, and wherein that cross member extends at its ends at an angle greater than 90°, preferably in the range of between 120° to 170°, and particularly at 155°.

But other embodied examples are also conceivable such as, for example, an X-shaped frame.

A simple way for setting up the portable light manipulator consists in providing connecting means, in particular fit-on pins on the longitudinal members for connecting them with the, in particular, tubular open ends of the at least one cross member. This type of connection is easy to establish and stable once construction is complete. Naturally, it is understood that receiving sleeves or plug-in bushings can be provided on the longitudinal members as well and into which the cross members can be inserted. Such a solution as well, which is indeed nothing more than a structural reversal of the pin-type solution, is achieved in the same easy manner by means of a simple construction and provides a stable hold.

For the engagement with the cross members having angled ends the fit-on pins and/or the corresponding plug-in sleeves are expediently aligned in such a way that they extend in an angular fashion as preset through the angle by which the cross member angularly extends at its ends.

A simple configuration of the means for fixing the manipulator cloth on the longitudinal members consists in providing longitudinal pockets along the longitudinal edges of the manipulator cloth. These longitudinal pockets can be formed, for example, by loops that are constructed either in the cloth-type of the manipulator cloth itself, or that are fixedly attached thereto such as, for example, by being sewn to the cloth. The loops therein can consist of a textile material, in particular, any such material that provides elasticity. This way, it is possible for the elasticity of the loops to promote the hold of the frame if the manipulator cloth itself is not elastic. If the manipulator cloth itself is elastic, the correspondingly disposed loops can be made of a non-elastic material or of an elastic material, and wherein in the latter case the overall elasticity of the tension-stretched cloth (with the tension created by the manipulator cloth and loops) is increased even further.

The assembly of the portable light manipulator is simplified if cutouts are provided in the longitudinal pockets in those areas where cross members are fixed to longitudinal members. These cutouts can extend on the rear as well as on the front side of the portable light manipulator in order to ensure free access to the connecting sites between longitudinal members and cross members, thus allowing for an unimpeded assembly of the light manipulator.

In particular, if the light manipulator has large dimensions such as, for example, a width of more than 1.5 m (4.92 feet), in the disassembled state of the portable light reflector it is advantageous in the interest of compactness of its shape if the longitudinal members and/or the cross members can be separated in the longitudinal direction. In such a case, in fact, these elements could be shortened one more time by division when they are folded together (in the disassembled state of the light manipulator). Correspondingly, the longitudinal members and/or cross members that must be transported (more specifically, their parts) are limited in terms of their length, meaning they can be easily carried by one person.

Even if, in particular, for such light manipulators with small surface areas one cross member is basically sufficient for constructing the frame, it is possible to use two or, also for larger light manipulators, three and more cross members. The number of the cross members must be selected, in particular, according to such criteria that are established on the basis of the tension that is required on the manipulator cloth in its operational state. In fact, if not enough cross members are provided that are executed as tension bars and if the distance between such cross members is too great, the measure of tension that is active in certain regions of the manipulator cloth may be insufficient, which may cause folds to form or result in similar instabilities that interfere with the desired illumination results to be created using the light manipulator.

The portable light manipulator according to the invention can be configured, in particular, as a light reflector, to which end the manipulator cloth is a reflector cloth with, for example, a reflective coating; but it can just as well be configured as a light diffuser with a diffuser cloth as manipulator cloth having light-softening values in a desired range. In particular, it is also possible therein to provide a portable light manipulator with selectable properties by adding varying manipulator cloths to one structural frame such as, for example, a reflector cloth and one or multiple diffuser cloths such as, for example, cloths having different light transmission values.

SHORT DESCRIPTION OF THE FIGURES IN THE DRAWING

Further characteristics and advantages of the invention can be derived from the subsequent description of an embodiment as demonstrated in the enclosed figures. Shown are as follows:

FIG. 1 is a view of an embodied example of a light manipulator according to the invention in the operational position, seen from the rear, meaning from the back-side of the surface area of the manipulator;

FIG. 2 is a detail of the left upper part of the frame, seen in an enlarged scale;

FIG. 3 is a view corresponding to FIG. 2 but of the right upper corner of the frame;

FIG. 4 is a view of a cross member with a bent end;

FIG. 5 is a view of the left part of the cross member from FIG. 4 configured as a tension bar, seen on an enlarged scale and with the representation of the spring-loaded longitudinal adjustment possibility;

DESCRIPTION OF THE EMBODIED EXAMPLES

16

Figure 6:
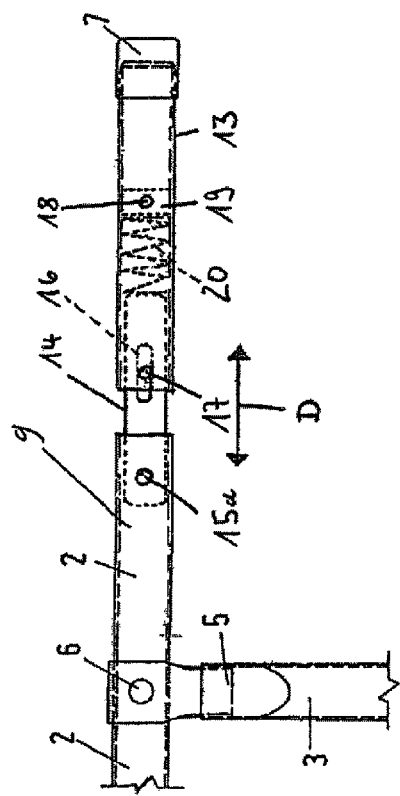
FIG. 6 is a detail of the left, upper part of the frame with spring-loaded longitudinal adjustment possibility.

The light manipulator as shown in FIG. 1 is comprised of a frame, which consists essentially of two longitudinal members 2 and three cross members 3 configured as tension bars, as well as a manipulator cloth 1 that is stretched over this frame.

The manipulator cloth 1 herein can be, in particular, a reflector cloth or a diffuser cloth. The manipulator cloth 1 consists of a spring-elastic material with elastic threads, for example, incorporated in the cloth. In the stretched state, the spring tension goes into effect in order to help hold the frame together and to prevent the connections between longitudinal members 2 and cross members 3 becoming detached. Loops 12 are configured along the longitudinal edges of the manipulator cloth 1 through which the longitudinal members 2 are routed. Said loops 12 can be made of the same material as the manipulator cloth, or they can be constituted of a separate material and fixedly connected with the actual manipulator cloth such as, for example, by sewing them together. At the corners, the loops 12 are closed to form the pockets 22. The ends of the longitudinal members 2 are received in said pockets. Such pockets are advantageous, in particular, if the longitudinal members 2 also include spring-loaded movement sections 9, 13 (see FIG. 6)

FIG. 2 demonstrates that clamps 4 with fit-on pins 5 are fastened to the longitudinal members 2 by means of rivets 6. The fit-on pins 5 fit tightly onto the tubes that constitute the cross member 3. The end caps 7 are fitted onto the ends of the longitudinal members 2 to protect of the longitudinal members 2 and the loops 12, or respectively, the pockets 22 of the manipulator cloth 1. Instead of the end caps 7, it is also possible to insert plugs in the tube ends. The longitudinal members 2 are divided in this embodiment in order to obtain correspondingly shorter parts in the transportation state. At the point of division they are connected by means of fit-on sleeves 8 (see FIG. 3).

FIG. 4 depicts a side view of the cross member 3, three of which are used in the embodied example as shown in FIG. 1. The ends 10 of the cross member 3 that are connected by a straight connecting piece 11 are bent at an angle as the observer will clearly notice upon consulting FIG. 4; specifically, they are bent toward the plane that is defined by the manipulator cloth 1. In FIG. 4 this plane is perpendicular relative to the plane of the drawing and is located above the cross member 3 represented therein. The angle W by which the ends 10 are bent is larger than 90°; it is ca. 155° in the present embodied example. By pushing the cross member 3 onto the fit-on pins 5 that are fastened with the aid of the clamps 4 and rivets 6 on the longitudinal members 2 there results a stable three-dimensional spatial structure that is held together by spring tensions. This spring tension is generated, on the one hand, by the elasticity of the manipulator cloth 1 and/or the pockets 12 and, on the other hand, by the configuration for generating a preload of the cross members 3 that are configured as tension bars, as illustrated in further detail in FIG. 5. The cross members 3 are indeed subdivided in this embodied example near the transition between the connecting piece 11 and the end 10 into a first moving section 9 comprising the end 10 and a second moving section 13 in the area of the connecting piece 11. Both tubular sections are connected by an inner tube 14 that is inserted into these sections. The inner tube 14 is immovably fixed to the first moving section 9 by a rivet 15. In relation to the second moving section 13, on the other hand, it is possible to displace the inner tube 14 in the longitudinal direction of the connecting piece 11, which means this first moving section 9 can be slid in relation to this second moving section 13 as well. This sliding action is indicated by a double arrow D. To this end, an oblong hole 16 is provided in the inner tube 14 that is penetrated by a stud 17 (for example, a rivet) that is fixedly connected with the second moving section 13 of the cross member 3. The interaction of the oblong hole 16 and the stud 17 results in a longitudinal sliding action of the inner tube 14 relative to the second moving section 13 while, in contrast, relative to the second moving section 13 the inner tube 14 is disposed in a twist-safe manner. This is important in order for the cross member 3 to maintain, by its angularly bent ends 10, the necessary alignment for the assembly of the frame.

Instead of rivet 15 it is also possible to use a cotter pin, in particular a secured cotter pin, a spring clip or a linchpin. This allows for rendering the bar, presently the cross member 3, divisible in an easy manner, which means that the first moving section 9 can be separated from the second moving section 13 or, respectively, the inner tube 14.

The second moving section 13 further contains a stop 19 that is fastened in a stationary position via a rivet 18. A coil spring 20 is disposed as a pressure spring element between this stop 19 and the end of the inner tube 14 that extends into the second moving section 13. This coil spring presses on the end of the inner tube 14 and forces the inner tube out of the second moving section 13, thus resulting in a preload of the cross member 3, which is executed as tension a bar, into a longer extension in which the first moving section 9 and the second moving section 13 are forced away from each other. A stop for this sliding action is provided by the end of the oblong hole 16 that is pointed toward the coil spring 20 when the same makes contact with the stud 17.

To assemble the light manipulator, first the longitudinal members 2 are threaded in the loops 12 and the ends of the longitudinal members are, if necessary, inserted in the pockets 22, and wherein the clamps 4 come to lie together with the fit-on pins 5 in the cutouts 21. Now the cross members 3 are inserted. To this end, they are first placed by a first end on a fit-on pin 5 on one of the longitudinal members 2, and thereafter compressed against the spring force of the coil spring 20 of the cross member 3, which is executed as a tension bar, by moving the first moving section 9 in the direction of the second moving section 13. Thus shortened, if necessary slightly stretching the manipulator cloth 1, the end 10 can be guided over the fit-on pin 5. Even after assuming its final position, the spring tension caused, on the one hand, by the elastic manipulator cloth 1 and, on the other hand, by the spring forces of the spring coils 20 in the cross members 3 acting upon the frame is thus maintained.

This interaction of the two spring forces results in an especially stable and error-proof, stretched tension in the manipulator cloth 1 when the same is in its ready-to-use state. Moreover, the cross members 3 can be inserted with a lesser expenditure of force in the frame because only the spring force of the coil spring 20 must be overcome due to the relative mobility of the first moving section 9 with regard to the second moving section 13; this is superior to the prior art that envisions rigid cross members against which for their insertion the manipulator cloth 1 had to be stretched altogether against the elastic spring tension.

Due to the angle W, which is larger than 90°, there results, through the interaction of the spring tension of the manipulator cloth 1 and the coil springs 20, a stable and torsion-proof construction that is very light and can be easily assembled and disassembled. In an embodied example in which the manipulator cloth has an area of 2.5 square meters (26.91 square feet), its total weight is approximately 2 kg (4.41 lbs). In the assembled state the total structure, meaning the light manipulator in all of its parts, will fit a transportation tube of ca. 10 cm (3.94 inches) diameter and 110 cm (3.61 feet) length. There is no hardware such as, for example, loose screws and the like that could be lost. The entire assembly is done by push-and-plug. The connections are held, on the one hand, by the intrinsic tension of the manipulator cloth 1 and/or by the material of the loops 12 and/or pockets 22 and, on the other hand, by the tension force of the coil springs 20, which is why the plug and push connections are securely held together and the manipulator cloth 1 remains reliably stretched.

FIG. 6 shows an alternative option for the light manipulator from FIGS. 1 to 5 by providing the longitudinal members 2 instead of the cross members 3 with the spring-loaded moving sections 9, 13. The cross members 3 are executed without moving sections therein. But such spring-loaded moving sections 9, 13 can also be provided simultaneously on the longitudinal members 2 as well as on the cross members 3.

The loops 12 of the manipulator cloth 1 are closed at their corners to form pockets 22. The remaining loops are not necessarily required in this configuration having moving section 9, 13 only in the longitudinal members. All four longitudinal members 2 that have their ends in the pockets 22 of the manipulator cloth 1 are configured with moving sections. A terminal section of such a longitudinal member 2 is shown in FIG. 6. The interaction of the spring forces of the spring-loaded moving sections 9, 13 in the longitudinal members 2 and the elastic manipulator cloth 1 results in an especially stable and error-proof, tightly stretched manipulator cloth 1 when it is in its ready-to-use operational state.

In this embodiment, near their ends, the longitudinal members 2 are subdivided between the clamps 4 and caps 7, in a first moving section 9 and a second moving section 13. Correspondingly, both longitudinal members from FIG. 1 include two first moving sections 9 and two second moving sections 13.

Figure 7:
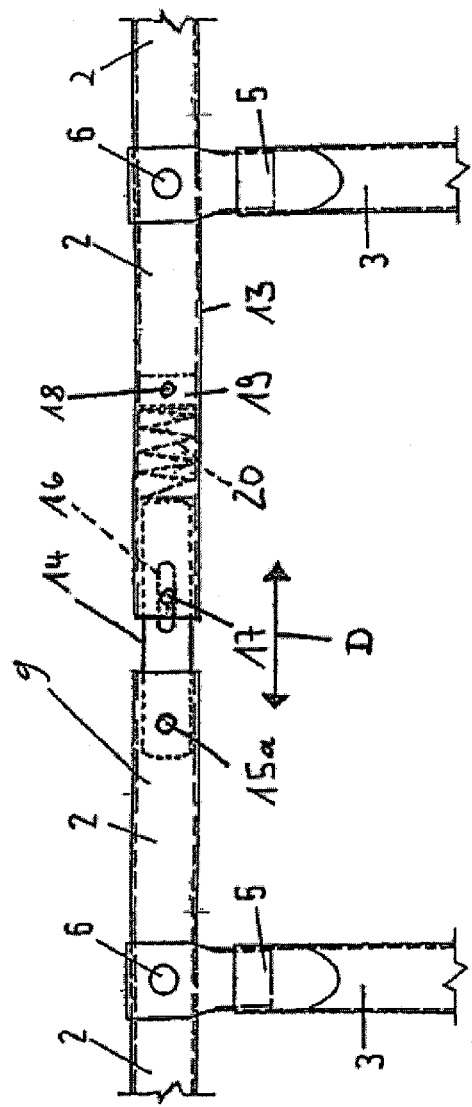
FIG. 7 is a detail of the middle, upper part of the frame with spring-loaded longitudinal adjustment possibility.

Both first and second moving sections 9, 13 are connected, respectively, by an inner tube 14 that is inserted in these sections. The inner tube 14 is immovably fastened on the first moving section 9 by means of a cotter pin 15a. In relation to the second moving section 13, however, the inner tube 14 can be moved in the longitudinal direction of the longitudinal member 2, and thereby the first moving section 9 can be displaced in relation to the second moving section 13. The double arrow points to this mobility. To this end, an oblong hole 16 is provided inside the inner tube 14 that is penetrated-through by a stud 17 (for example, a rivet) that is fixedly connected to the second movement section 13 of the longitudinal member 2. By the interaction between the oblong hole 16 and the stud 17 a longitudinal mobility of the inner tube 14 in relation to the second moving section 13 is achieved, and wherein, in contrast, the inner tube 14 is disposed in a twist-proof manner in relation to the second moving section 13. This safety against twisting is not necessarily required for the presently selected configuration of the longitudinal member 2. But it is advantageous if the moving parts 9, 13 are disposed between the clamps 4 and/or cross members 3 as shown in an exemplary manner in FIG. 7.

In addition, a stop 19 is furthermore fixed in a stationary manner in the second moving section 13 by means of a rivet 18. A coil spring 20 is disposed as a pressure spring element between this stop 19 and the end of the innertube 14 that extends into the second moving section 13. This coil spring 20 presses against the end of the inner tube 14 and forces the inner tube 14 out of the second moving section 13, thus creating a preload to the longitudinal bars 2 that are executed as tension bars in a longer extension, and wherein the first moving section 9 and the second moving section 13 are forced away from each other. The end of the oblong hole 16 that faces the coil spring 20 provides a stop for this movement when the same makes contact with the stud 17.

The moving sections 9, 13 therein and/or the first moving section 9 and the inner tube 14, which in turn can be connected by means of the stud 17, which may also be a rivet, with the second moving section 13, are connected to each other by means of cotter pin 15a, in particular a secured cotter pin, a spring clip or a linchpin. The cross member can thus be separated into two pieces when the cotter pin 15a is removed, thus facilitating its transportation.

It is understood that the light manipulator can also be fastened to a stand using a corresponding adapter.

In the alternative or in addition, moving sections can also be disposed between two clamps 4 and/or between two cross members. It is also conceivable to provide only one first and one second moving section per longitudinal member 2, respectively.

LIST OF REFERENCE SIGNS 1 manipulator cloth
2 longitudinal member
3 cross member
4 clamp
5 fit-on pin
6 rivet
7 cap
8 fit-on sleeve
9 moving section
10 end
11 connecting piece
12 loops
13 second moving section
14 inner tube
15 rivet
15a cotter pin, linch pin
16 oblong hole
17 stud
18 rivet
19 stop 20 coil spring
21 cutout
22 pocket
D double arrow

The invention claimed is:

1. A portable light manipulator comprising:
a frame and a manipulator cloth that is stretched or can be stretched on the frame, and wherein the frame comprises:
at least one tension bar, which has at least two moving sections that are movable in a longitudinal direction of the tension bar and are connected to one another, said moving sections being spring-loaded so as to be capable of being forced apart from one another by spring force in the longitudinal direction of the tension bar, and wherein the at least one tension bar is tubular at least in the region in which the two moving sections are connected with each other, and wherein an inner tube or a solid inner cylinder is inserted in an adjacent tube opening of the moving sections that is immovably connected with a first of the moving sections and that is movably connected by means of a preset travel with a second moving section by means of a forcible guide acting in the longitudinal direction of the at least one tension bar, wherein the forcible guide comprises at least one of an oblong hole in the inner tube and the inner cylinder extending in the longitudinal direction of the at least one tension bar and a stud disposed in a stationary manner on the second moving section penetrating through said oblong hole; and wherein a compression spring element is disposed in the second moving section between a stop that is stationary in relation to this second moving section and an end of the inner tube or solid cylinder; and wherein the compression spring element is a coil spring; and
wherein the manipulator cloth is a reflector cloth or a diffuser cloth and includes:
terminal fasteners which fasten the manipulator cloth to the frame, and wherein the manipulator cloth or the fasteners have an elasticity that pulls, when in an operating position of the light manipulator, the moving sections toward each other.

2. The portable light manipulator according to claim wherein the frame comprises at least one member that extends at the at least one member's ends in an angular fashion at an angle (W), and wherein that the angle (W) is greater than 90°.

3. The portable light manipulator according to claim 2, wherein the angle (W) is in the range of 120° to 170°.

4. The portable light manipulator according to claim 3, wherein the angle (W) is 155°.

5. The portable light manipulator according to claim 1 wherein the frame can be at least one of disassembled and folded together.

6. The portable light manipulator according to claim 5 wherein the force that is created in the operating position, due to the elasticity of the manipulator cloth acting upon the frame, promotes the cohesiveness of the frame.

7. The portable light manipulator according to claim 1, wherein the frame is comprised of two longitudinal members and at least one cross member connecting the longitudinal members.

8. The portable light manipulator according to claim 7 wherein at least one of the cross member and the longitudinal members are configured as tension bars.

9. The portable light manipulator according to claim 8 wherein the at least one cross member extends at the at least one cross-member's ends in an angular fashion at an angle (W), and the angle (W) is greater than 90°.

10. The portable light manipulator according to claim 9, wherein the angle (W) is in the range of 120° to 170°.

11. The portable light manipulator according to claim 10, wherein the angle (W) is 155°.

12. The portable light manipulator according to claim 7, further comprising a connector provided on the longitudinal members; and the at least one cross member has tubular, open ends; and wherein the connector engages the tubular, open ends of the at least one cross member for the assembly of the frame.

13. The portable light manipulator according to claim 12, wherein the connector on the longitudinal members is a fit-on pin or a plug-in bushing.

14. The portable light manipulator according to claim 12, wherein the at least one cross member extends at the at least one cross-member's ends in an angular fashion at an angle (W); and wherein the direction of axes of the connector and the ends of the cross member are the same when in the operating position, and is defined by the angle (W).

15. The portable light manipulator according to claim 1, wherein the frame is comprised of two longitudinal members and at least one cross member connecting the longitudinal members; and wherein the fasteners on the manipulator cloth include longitudinal pockets which are provided at the cloth's longitudinal edges; and a portion of at least one of the longitudinal members is received in one of the pockets.

16. The portable light manipulator according to claim 15 wherein the longitudinal pockets have cutouts in the regions where the longitudinal members and the cross members are fixed.

* * * * *

UNITED STATES PATENT AND TRADEMARK OFFICE
CERTIFICATE OF CORRECTION

| | | |
|---|---|---|
| PATENT NO. | : 8,875,457 B2 | Page 1 of 1 |
| APPLICATION NO. | : 13/391050 | |
| DATED | : November 4, 2014 | |
| INVENTOR(S) | : Geller | |

It is certified that error appears in the above-identified patent and that said Letters Patent is hereby corrected as shown below:

In the Claims,

Column 9, lines 42-43 (Claim 2) "according to claim wherein" should be changed to --according to claim 1 wherein--

Signed and Sealed this
Seventh Day of April, 2015

Michelle K. Lee
*Director of the United States Patent and Trademark Office*